US012650904B2

(12) United States Patent
Eberlein

(10) Patent No.: US 12,650,904 B2
(45) Date of Patent: Jun. 9, 2026

(54) GENERIC TENANT DATA REPLICATION FOR DISASTER RECOVERY

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 10 days.

(21) Appl. No.: 18/966,690

(22) Filed: Dec. 3, 2024

(65) Prior Publication Data

US 2026/0154164 A1 Jun. 4, 2026

(51) Int. Cl.
| | |
|---|---|
| *G06F 11/00* | (2006.01) |
| *G06F 11/14* | (2026.01) |
| *G06F 11/1446* | (2026.01) |
| *G06F 16/23* | (2019.01) |

(52) U.S. Cl.
CPC ...... *G06F 11/1464* (2013.01); *G06F 11/1448* (2013.01); *G06F 16/2358* (2019.01)

(58) Field of Classification Search
None
See application file for complete search history.

(56) References Cited

U.S. PATENT DOCUMENTS

| | | | |
|---|---|---|---|
| 8,706,772 B2 | 4/2014 | Hartig et al. |
| 8,875,122 B2 | 10/2014 | Driesen et al. |
| 9,009,105 B2 | 4/2015 | Hartig et al. |
| 10,083,061 B2 | 9/2018 | Odenheimer et al. |

| | | | |
|---|---|---|---|
| 10,268,472 B2 | 4/2019 | Eberlein et al. |
| 10,700,949 B1 | 6/2020 | Eberlein |
| 10,715,405 B2 | 7/2020 | Eberlein |
| 11,218,388 B2 | 1/2022 | Eberlein |
| 11,409,719 B2 | 8/2022 | Eberlein |
| 11,907,198 B2 | 2/2024 | Eberlein et al. |
| 12,015,680 B1 | 6/2024 | Eberlein |
| 2016/0342335 A1* | 11/2016 | Dey ...................... G06F 3/0619 |
| 2025/0265154 A1* | 8/2025 | Eberlein ............. G06F 11/1415 |

OTHER PUBLICATIONS

U.S. Appl. No. 18/635,486, filed Apr. 15, 2024, Eberlein.

* cited by examiner

*Primary Examiner* — Bryce P Bonzo
*Assistant Examiner* — Gabriella Kanani Shelton
(74) *Attorney, Agent, or Firm* — Fish & Richardson P.C.

(57) ABSTRACT

A computer-implemented method for generic tenant data replication for disaster recovery, includes regularly checking, by a primary replication agent on a primary site, for changes to a primary change log on the primary site. Based on an insert of a new change record in a secondary change log on a secondary site, triggering a stored procedure from secondary stored procedures on the secondary site, that extracts a change operation and data from the secondary change log and performs the changed operation on a secondary tenant table on the secondary site. By a secondary replication agent on the secondary site and from the primary replication agent, receiving a call not containing a sequence id for a change record marked as completed in the secondary change log, and deleting the change record. Using a replication agents control plane, providing central monitoring for the primary replication agent and the secondary replication agent.

20 Claims, 6 Drawing Sheets

Figure 5:
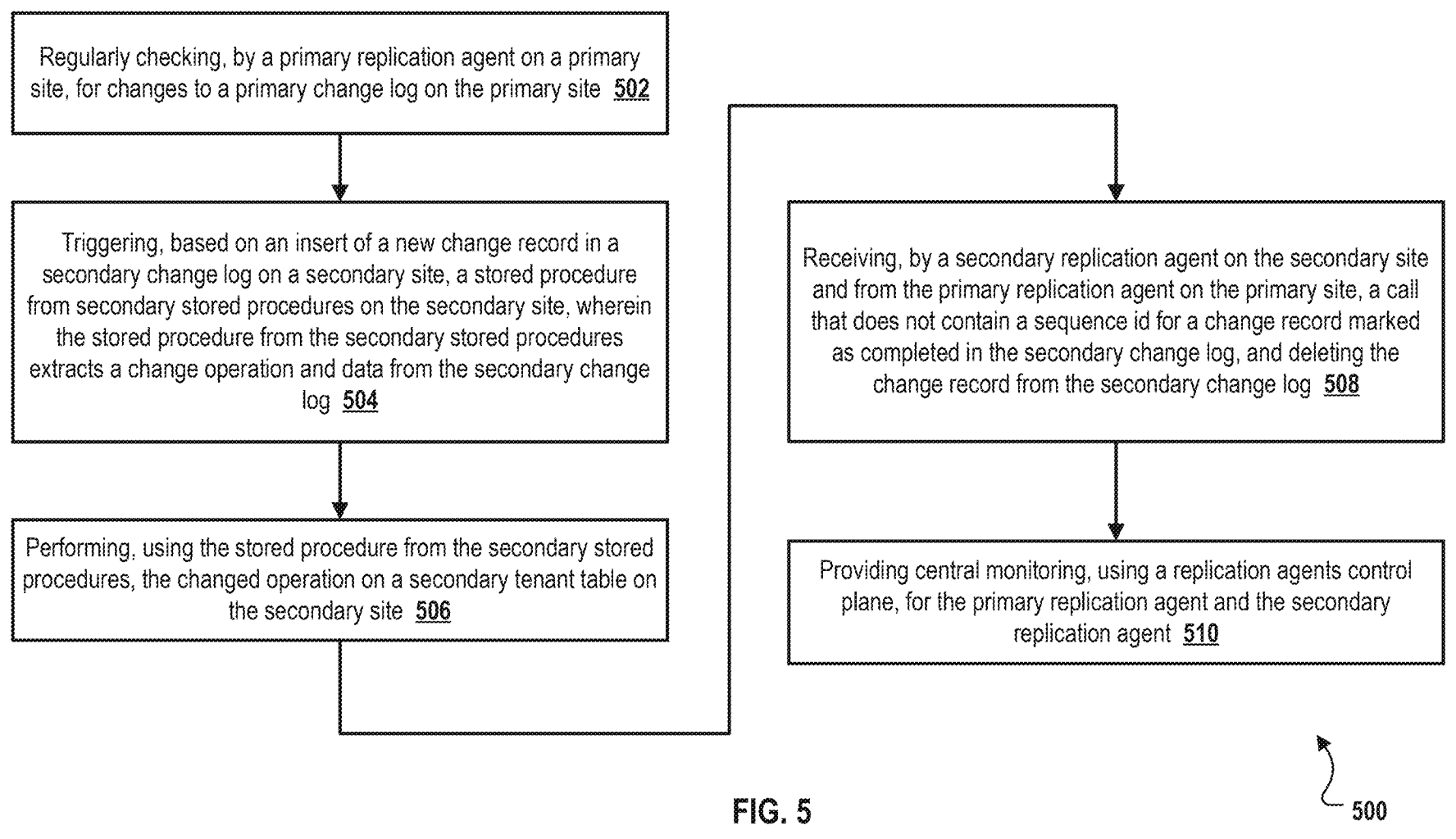

Regularly checking, by a primary replication agent on a primary site, for changes to a primary change log on the primary site  502

Triggering, based on an insert of a new change record in a secondary change log on a secondary site, a stored procedure from secondary stored procedures on the secondary site, wherein the stored procedure from the secondary stored procedures extracts a change operation and data from the secondary change log  504

Performing, using the stored procedure from the secondary stored procedures, the changed operation on a secondary tenant table on the secondary site  506

Receiving, by a secondary replication agent on the secondary site and from the primary replication agent on the primary site, a call that does not contain a sequence id for a change record marked as completed in the secondary change log, and deleting the change record from the secondary change log  508

Providing central monitoring, using a replication agents control plane, for the primary replication agent and the secondary replication agent  510

Computer 602

Interface 604

Processor 605

Memory 607

603

Application 608

API 612

Service Layer 613

Power Supply 614

Database 606

Network 630

GENERIC TENANT DATA REPLICATION FOR DISASTER RECOVERY

BACKGROUND

Disaster recovery is a top priority for cloud-computing users. As data is entrusted to a cloud computing system, business and other activities depend on an ability to provide continuous access to the data, even under disastrous circumstances (e.g., earthquakes, floodings, fire, and war). Although a probability of such events occurring is small, many cloud-computing users are willing to pay a premium for replicating their data to multiple datacenters across different regions to be prepared for an extended outage in one or more of them.

However, not all cloud-computing users will opt-in to multi-region disaster recovery protection at a premium price, or at least not for all of their solutions. As this decision is individual per tenant, this complicates implementation of data replication for disaster recovery. Tenant data may also be isolated on a database level, on a schema level, or be implemented by using a discriminator column within one shared schema in one shared database. While there exist solutions for full database replication and schema level replication can be realized by replicating all tables of the schema, there is no generic solution available if tenant data is separated by a discriminator column in every tenant dependent table in one shared schema.

SUMMARY

The present disclosure describes generic tenant data replication for disaster recovery.

In an implementation, a computer-implemented method for generic tenant data replication for disaster recovery, comprises: regularly checking, by a primary replication agent on a primary site, for changes to a primary change log on the primary site; triggering, based on an insert of a new change record in a secondary change log on a secondary site, a stored procedure from secondary stored procedures on the secondary site, wherein the stored procedure from the secondary stored procedures extracts a change operation and data from the secondary change log; performing, using the stored procedure from the secondary stored procedures, the changed operation on a secondary tenant table on the secondary site; receiving, by a secondary replication agent on the secondary site and from the primary replication agent on the primary site, a call that does not contain a sequence id for a change record marked as completed in the secondary change log, and deleting the change record from the secondary change log; and providing central monitoring, using a replication agents control plane, for the primary replication agent and the secondary replication agent.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. The described approach provides a generic solution that can completely offload replication of tenant data separated by a discriminator column to reusable components. There is no implementation effort for affected applications and services, which should be accelerated. Moreover, with a central control plane, replication can be managed and monitored centrally.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

FIG. 5 is a flowchart illustrating an example of a computer-implemented method for generic tenant data replication for disaster recovery, according to an implementation of the present disclosure.

Like reference numbers and designations in the various drawings indicate like elements.

DETAILED DESCRIPTION

Figure 1:
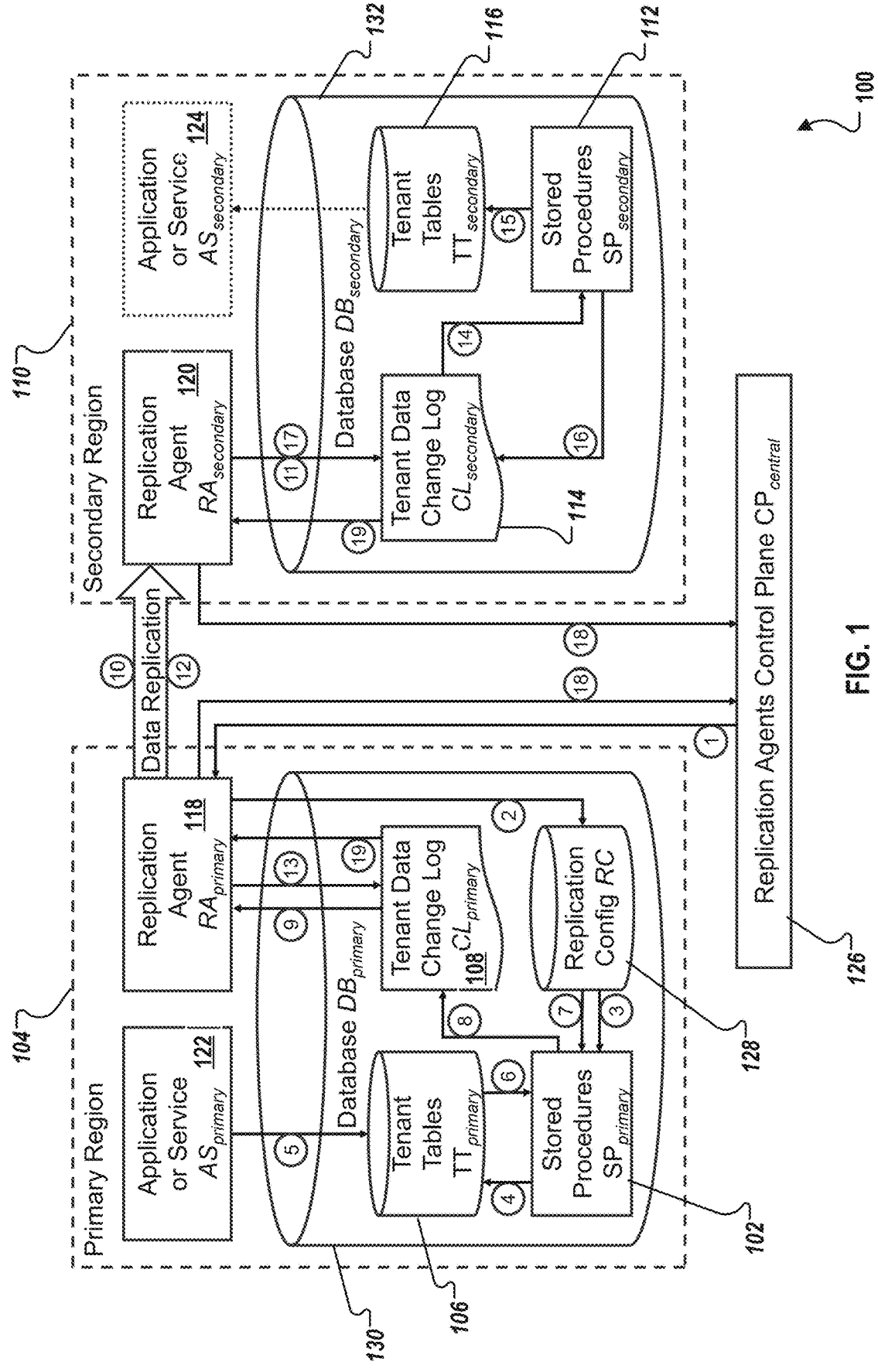
FIG. 1 is a block diagram illustrating an example of a system for generic tenant data replication for disaster recovery and steps for configuration, replication, and monitoring, according to an implementation of the present disclosure.

The following detailed description describes generic tenant data replication for disaster recovery and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Disaster recovery is a top priority for cloud-computing users. As data is entrusted to a cloud computing system, business and other activities depend on an ability to provide continuous access to the data, even under disastrous circumstances (e.g., earthquakes, floodings, fire, and war). Although a probability of such events occurring is small, many cloud-computing users are willing to pay a premium for replicating their data to multiple datacenters across different regions to be prepared for an extended outage in one or more of them.

However, not all cloud-computing users will opt-in to multi-region disaster recovery protection at a premium price, or at least not for all of their solutions. As this decision is individual per tenant, this complicates implementation of data replication for disaster recovery. Tenant data may also be isolated on a database level, on a schema level, or be implemented by using a discriminator column within one shared schema in one shared database. While there exist solutions for full database replication (e.g., SAP HANA asynchronous system replication (HSR) and Global Development Group POSTGRESQL read replica) and schema level replication can be realized by replicating all tables of the schema (e.g., using SAP HANA SMART DATA INTEGRATION (SDI) or RECORD TO REPORT (RTR) and Global Development Group POSTGRESQL logical replication), there is no generic solution available if tenant data is separated by a discriminator column in every tenant dependent table in one shared schema.

In a current approach, an application or service storing tenant data separated by a tenant identifier in a discriminator column reads the data of tenants that opted-in to multi-region disaster recovery by running a series of select statements filtering only the selected tenants and exports it for replication to another datacenter region. The application or service also needs to implement delta handling, to minimize the data volume to be transferred. And finally, the approach needs to provide import functionality at a replication target site, for receiving replicated data (full or delta) and putting the replicated data into the database in the remote region.

A generic solution is needed that can offload most of the work to reusable components and minimize implementation efforts for all affected applications and services. The described approach is fully generic and provided as a combination of a database stored procedures and an application sidecar. As they run independently, both are language independent and do not require code changes in the consuming applications or services.

FIG. 1 is a block diagram illustrating an example of a system for generic tenant data replication for disaster recovery and steps for configuration, replication, and monitoring, according to an implementation of the present disclosure.

$SP_{primary}$ 102 is a collection of various stored procedures, such as to react on changes to the configuration but also to react on changes to tenant tables. Stored Procedures from $SP_{primary}$ 102 register database triggers on a primary site (region) 104 to capture any changes to relevant Tenant Tables ($TT_{primary}$) 106 in a generic Tenant Data Change Log ($CL_{primary}$) 108. On a secondary site 110, corresponding Stored Procedures from $SP_{secondary}$ 112 have triggers on the Tenant Data Change Log ($CL_{secondary}$) 114 that unwrap logged changes and put them in Tenant Tables on the secondary site ($TT_{secondary}$) 116. Transport of changes from/to the logs between the primary and secondary site is performed by Replication Agents on the primary and secondary sites (i.e., $RA_{primary}$ 118 and $RA_{secondary}$ 120, respectively) that run as sidecars to the consuming applications or services (i.e., 122 and 124, respectively). As changes are transported, tenant ids are also converted from primary to secondary.

The whole configuration of which tenants need to be replicated, where they are replicated to, what the tenant ids are on the primary and the secondary site, as well as monitoring of replication status is managed by a central Replication Agents Control Plane ($CP_{central}$) 126 that runs outside of the regions it manages. A Replication Config (RC) 128 is stored in an application or service database 130 on the primary site only, while the application or service database 132 on the secondary site 110 acts generic and does not need to be configured.

The described approach is best described as a series of steps that are performed during the three major phases: 1) configuration; 2) replication; and 3) monitoring. Turning to FIG. 1:

Configuration.

At (1), the Replication Agents Control Plane ($CP_{central}$) 126 has a list of all deployed Replication Agents (both primary and secondary) for all applications and services. While secondaries do not need to be configured, coordinates need to be known as information that is configured on the primaries (i.e., where replicated data is sent to). When a customer decides to opt-in to multi-region disaster recovery for a specific solution, the applications and services comprising this solution are determined and, for each of them, $CP_{central}$ 126 configures $RA_{primary}$ 118 with a tenant id on the primary site 104, the corresponding tenant id on the secondary site 110, and the endpoint of $RA_{secondary}$ 120 to which replicated data shall be sent to.

At (2), running as a sidecar to the Application or Service $AS_{primary}$ 122, for which it replicates tenant data, $RA_{primary}$ 118 stores this information as Replication Config RC 128 in the application or service Database ($DB_{primary}$) 130. As part of the development and deployment process of $AS_{primary}$ 122 the Replication Config RC 128 was already provided with a list of tenant dependent tables and the tenant discriminator column names of each tenant dependent table, so after $CP_{central}$ 126 has deployed the replication parameters, RC 128 stores the following configurations:

List of tenant dependent tables,

For each tenant dependent table: name of discriminator column,

List of tenant ids (on primary site) for which data replication is active,

For each tenant id on primary site: tenant id and replication agent endpoint on secondary site.

At (3), there is a database trigger on inserts into the list of tenants config table 106, so a Stored Procedure from $SP_{primary}$ 102 is triggered and sets up further database triggers on all tenant dependent tables 106 for all insert/update/delete operations affecting the tenant id added for replication. This potentially requires different filters for various tables as it is supported that each tenant dependent table 106 uses a different discriminator column name (although this is a rarely used feature that, in some implementations, could be left out if a strict convention to use the identical tenant discriminator column name on all tables could be enforced).

At (4), a first and complete replication is started that is executed very similar to a regular delta replication that is described in (6) and following, with the difference that all tenant data is included in the replication, not just the data that was changed as described in (5). Otherwise, it behaves the same way, therefore it is not explicitly described here.

Replication.

At (5), during normal application or service use, $AS_{primary}$ 124 performs changes (insert/update/delete) to tenant tables $TT_{primary}$ 106.

At (6), with the tenant specific database triggers installed in (3), any create/insert/delete operation will trigger a Stored Procedure from $SP_{primary}$ 102 that captures this change. In case of initial complete replication (see (4)), content of all tenant-dependent tables is captured as create (insert) operations.

At (7), replication requires further configuration that $SP_{primary}$ 102 reads from RC 128:

Mapping from primary tenant id to secondary tenant id,

Discriminator column name for the changed table, and

Endpoint of Replication Agent on secondary site $RA_{secondary}$ 120.

At (8), with this configuration, $SP_{primary}$ 102 replaces the tenant id on primary site 104 with the tenant id on the secondary site 110 in the configured discriminator column for the captured change. It then writes the change, including the performed operation and all data used for the change (with the replaced tenant id) to the Tenant Data Change Log $CL_{primary}$ 108. The log also contains the endpoint of the Replication Agent $RA_{secondary}$ 120 where the change will be sent to, as well as a sequence id that: a) orders all changes in the context of this tenant and b) uniquely identifies this change record, which will be used in a later step to implement idempotency of changes. (8) marks the end of a database layer and further steps move into an application layer.

At (9), the Replication Agent $RA_{primary}$ 118 running as a sidecar to $AS_{primary}$ 122 regularly checks for changes to the Tenant Data Change Log $CL_{primary}$ 108. When a Stored Procedure from $SP_{primary}$ 102 inserts a new change to be replicated, the Replication Agent picks it up from the Tenant Data Change Log 108.

At (10), the Replication Agent $RA_{primary}$ 118 reads the endpoint of the Replication Agent on the secondary $RA_{secondary}$ 120 that is contained in the $CL_{primary}$ 108 record and sends the change to that endpoint.

At (11), the Replication Agent on the secondary $RA_{secondary}$ 120 receives the change and writes it to its own local Tenant Data Change Log $CL_{secondary}$ 114. If there are multiple changes contained in one data replication request (which might happen as $RA_{primary}$ 118 runs in intervals picking up all changes accumulated since a last run), changes are inserted in the order of their sequence id. If there are already records with the same sequence id in $CL_{secondary}$ 114, they are ignored as they are duplicates resulting from a transmission retry from $RA_{primary}$ 118 (see also explanation in (13)).

At (12), $RA_{secondary}$ 120 responds to the call from $RA_{primary}$ 118 in (10) returning all change record sequence ids it currently has in its $CL_{secondary}$ 114 to confirm that they have been received. This happens independent of their completion status as only reception and not completion is relevant at this point.

At (13), $RA_{primary}$ 118 deletes all records in $CL_{primary}$ 108 for which it received confirmation. If this response call should get lost, $RA_{primary}$ 118 will send the unconfirmed records again when it calls $RA_{secondary}$ 120 the next time and will then receive confirmation. $RA_{secondary}$ 120 would detect duplicate records by their sequence id and ignore them (see (11)). Or, if the original request call was lost, $RA_{secondary}$ 120 would receive the lost change records for the first time and proceed as usual, inserting them in $CL_{secondary}$ 114 and confirming their receipt.

At (14), the inserts of new change records trigger a Stored Procedure from $SP_{secondary}$ 112 registered on $CL_{secondary}$ 114 that extracts the change operation and data from the log record.

At (15), it then performs the change operation on the Tenant Table $TT_{secondary}$ 116 that was specified for this change. As tenant mapping has already been performed on the primary and no mapping of table names is necessary (identical applications and services are running in all regions), $SP_{secondary}$ 112 does not require any configuration, it does not even need to be aware of which column is used as tenant discriminator as the tenant id of the secondary is simply handled as regular data included in the change like all other data.

At (16), when the change on $TT_{secondary}$ 116 has been performed (but still within the same database transaction), the corresponding change record in $CL_{secondary}$ 114 is marked as completed.

At (17), when $RA_{secondary}$ 120 receives another call from $RA_{primary}$ 118 that does no longer contain the sequence id for a change record marked as completed, it can delete the record from $CL_{secondary}$ 114 as it is no longer needed: a) it has been processed and b) it will not be sent by $RA_{primary}$ 120 again as it obviously was deleted from $CL_{primary}$, 108, so it is no longer needed for detecting duplicate records. Monitoring.

At (18), the Replication Agents Control Plane $CP_{central}$ 126 not only provides central configuration, but as it is aware of all Replication Agents' endpoints (both primary and secondary), it can also provide central monitoring. For this, it regularly calls all Replication Agents ($RA_{primary}$ 118 and $RA_{secondary}$ 120) and queries them about the status of their Change Logs.

At (19), the Replication Agents then check the number of records in their Change Logs. A growing number of change log records on either indicates a problem, which is typically related to communication issues between Replication Agents. These issues then need be followed up by network specialists. However, a growing number of uncompleted change records on the secondary site indicate a different problem of failing change operation executions although they have been successfully replicated. This may be caused by local database issues (like locks or corrupt data) that need to be investigated by the application or service team. Interleaved Confirmation Protocol in Detail.

Figure 2:
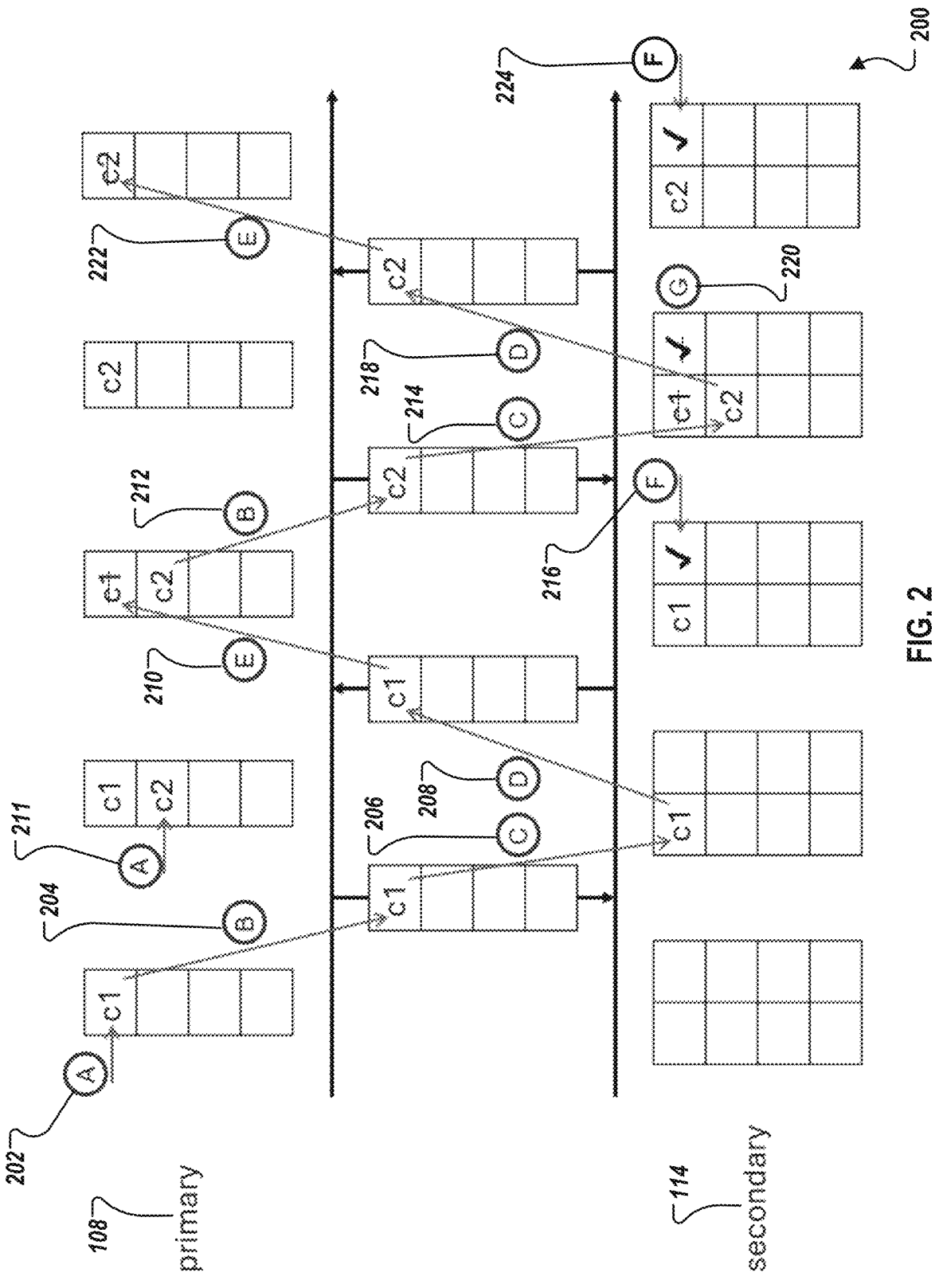
FIG. 2 is a block diagram illustrating communication between a primary site and a secondary site during a replication without errors, according to an implementation of the present disclosure.
Figure 3:
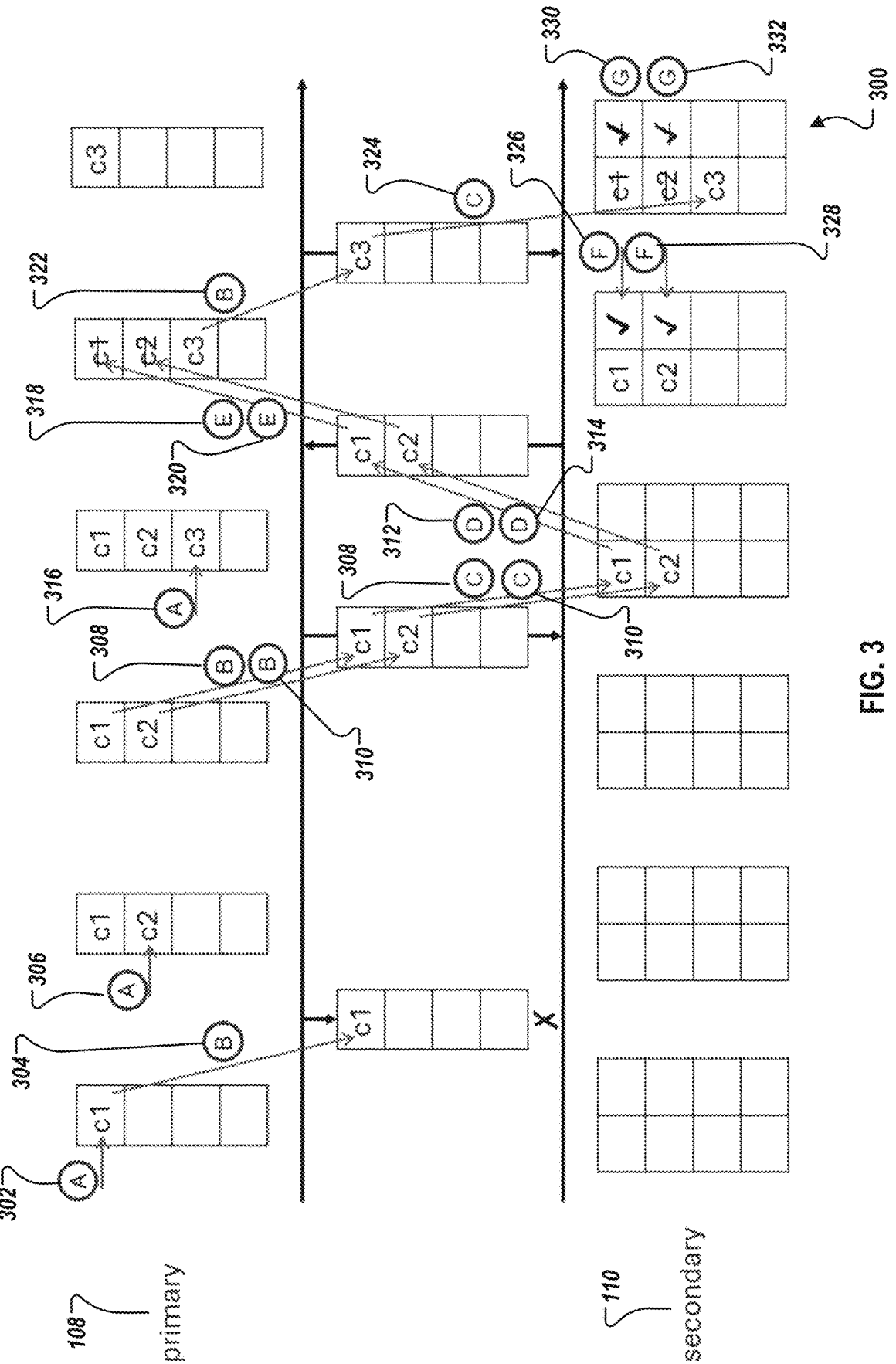
FIG. 3 is a block diagram illustrating replication where one request is lost but the changes are still replicated by including them again in a later call, according to an implementation of the present disclosure.
Figure 4:
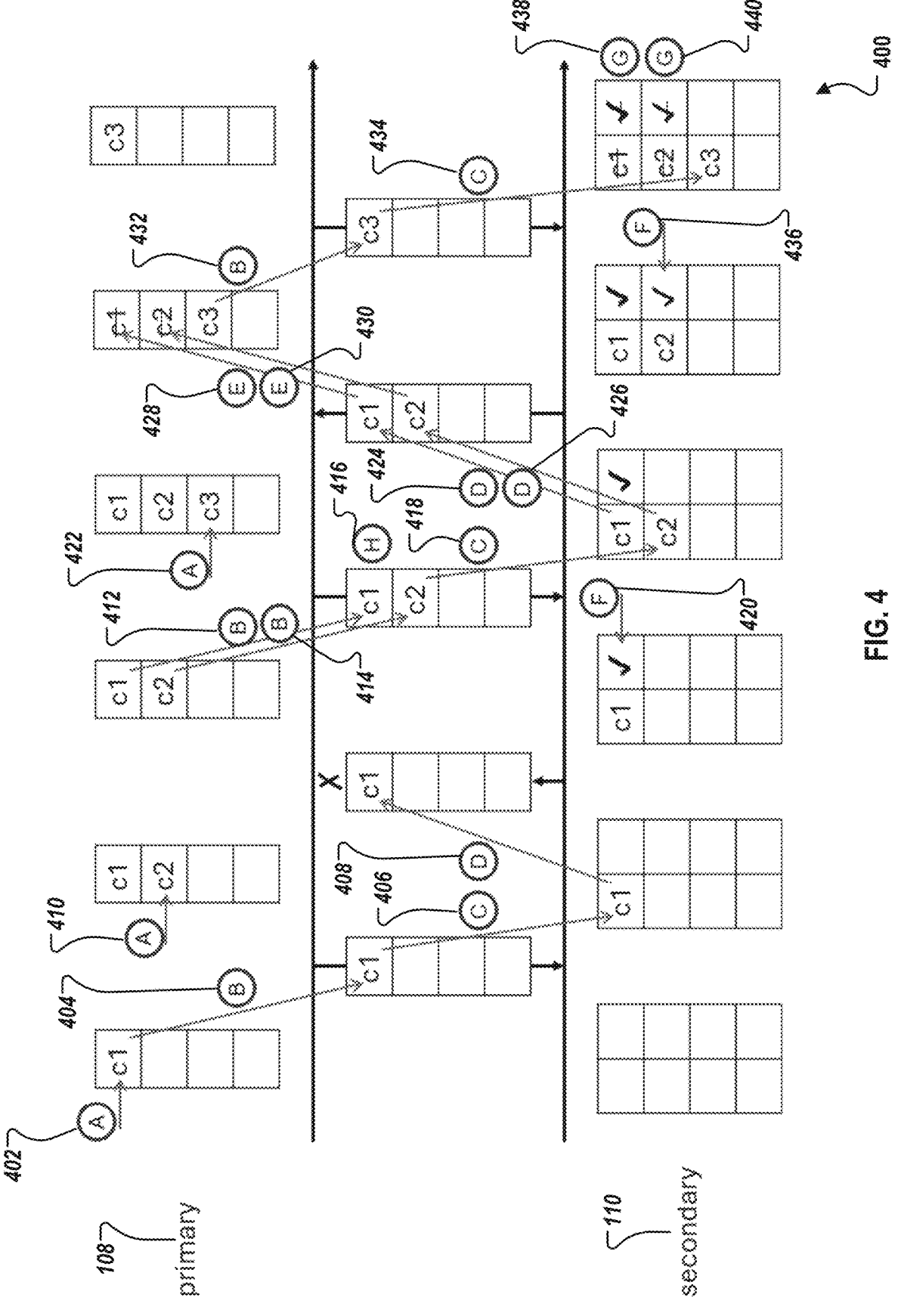
FIG. 4 is a block diagram illustrating replication where one confirmation response is lost, according to an implementation of the present disclosure. Here, this situation leads to resending the affected change, but the duplicate is detected and removed.

In the three depicted scenarios of FIGS. 2, 3, and 4 (with reference to components of FIG. 1), the following actions are executed at various points in the overall flow (note, in FIGS. 2, 3, and 4, a down arrow is a request and an up arrow is a response):

A: A change on the primary site 104 is captured and added to $CL_{primary}$ 108.

B: A change in $CL_{primary}$ 108 is included in a request sent to the secondary site 110.

C: A change sent with the request is inserted into $CL_{secondary}$ 114.

D: A sequence id from $CL_{secondary}$ 114 is added to the response returned to the primary site 104.

E: A change confirmed by its sequence id in the response is removed from $CL_{primary}$ 108.

F: A change that has been executed on $TT_{secondary}$ 116 is marked as completed in $CL_{secondary}$ 114.

G: A completed change is removed from $CL_{secondary}$ 114, as its sequence id was not included in the last request from the primary site 104.

H: A change is identified as duplicate by its sequence id and not added to $CL_{secondary}$ 114.

FIG. 2 is a block diagram 200 illustrating communication between a primary site and a secondary site during a replication without errors, according to an implementation of the present disclosure.

At 202, a change (c1) is captured and added to $CL_{primary}$ 108.

At 204, the change (c1) in $CL_{primary}$ 108 is included in a request sent to the secondary site 110.

At 206, the change (c1) is inserted into $CL_{secondary}$ 114.

At 208, a sequence id from $CL_{secondary}$ 114 is added to the response returned to the primary site 104.

At 210, a change confirmed by its sequence id in the response is removed from $CL_{primary}$ 108.

At 211, a change (c2) on the primary site 104 was captured and added to $CL_{primary}$ 108.

At 212, the change (c2) in $CL_{primary}$ 108 is included in a request sent to the secondary site 110.

At 214, the change (c2) sent with the request is inserted into $CL_{secondary}$ 114.

At 216, the change (c1) that has been executed on $TT_{secondary}$ 116 is marked as completed in $CL_{secondary}$ 114.

At 218, a sequence id from $CL_{secondary}$ 114 is added to the response returned to the primary site 104.

At 220, a completed change (c1) is removed from $CL_{secondary}$ 114, as its sequence id was not included in the last request from the primary site 104.

At 222, a change (c2) confirmed by its sequence id in the response is removed from $CL_{primary}$ 108.

At 224, a change (c2) that has been executed on $TT_{secondary}$ 116 is marked as completed in $CL_{secondary}$ 114.

FIG. 3 is a block diagram 300 illustrating replication where one request is lost but the changes are still replicated by including them again in a later call, according to an implementation of the present disclosure.

At 302, a change (c1) on the primary site is captured and added to $CL_{primary}$ 108.

At 304, the change (c1) in $CL_{primary}$ 108 is included in a request sent to the secondary site 110. Note that the change (c1) sent with the request is not inserted into $CL_{secondary}$ 114.

At 306, a change (c2) on the primary site 104 is captured and added to $CL_{primary}$ 108.

At 308 and 310, both changes (c1 and c2) in $CL_{primary}$ 108 are included in a request sent to the secondary site 110.

At 312 and 314, a sequence id from $CL_{secondary}$ 114 is added to the response returned to the primary site 104 for both changes (c1 and c2).

At 316, a change (c3) on the primary site 104 is captured and added to $CL_{primary}$ 108.

At 318 and 320, the changes (c1 and c2) confirmed by their sequence id in the response are removed from $CL_{primary}$ 108.

At 322, a change (c3) in $CL_{primary}$ 108 is included in a request sent to the secondary site 110.

At 324, the change (c3) sent with the request is inserted into $CL_{secondary}$ 114.

At 326 and 328, the changes (c1 and c2) that have been executed on $TT_{secondary}$ 116 are marked as completed in $CL_{secondary}$ 114.

At 330 and 332, completed changes (c1 and c2) are removed from $CL_{secondary}$ 114, as their sequence ids were not included in the last request from the primary site 104.

FIG. 4 is a block diagram 400 illustrating replication where one confirmation response is lost, according to an implementation of the present disclosure. Here, this situation leads to resending the affected change, but the duplicate is detected and removed.

At 402, a change (c1) is captured and added to $CL_{primary}$ 108.

At 404, the change (c1) in $CL_{primary}$ 108 is included in a request sent to the secondary site 110.

At 406, the change (c1) is inserted into $CL_{secondary}$ 114.

At 408, a sequence id from $CL_{secondary}$ 114 is added to the response returned to the primary site 104. Note that the change (c1) is not confirmed by its sequence id in the response and is not removed from $CL_{primary}$ 108.

At 410, a change (c2) is captured and added to $CL_{primary}$ 108.

At 412 and 414, the changes (c1 and c2) in $CL_{primary}$ 108 are included in a request sent to the secondary site 110.

At 416, a change (c1) is identified as a duplicate by its sequence id and not added to $CL_{secondary}$ 114.

At 418, a change (c2) sent with the request is inserted into $CL_{secondary}$ 114.

At 420, a change (c1) that has been executed on $TT_{secondary}$ 116 is marked as completed in $CL_{secondary}$ 114.

At 422, a change (c3) on the primary site 104 is captured and added to $CL_{primary}$ 108.

At 424 and 426, sequence ids (of c1 and c2) from $CL_{secondary}$ 114 are added to the response returned to the primary site 104.

At 428 and 430, changes (c1 and c2) confirmed by their sequence ids in the response are removed from $CL_{primary}$ 108.

At 432, the change (c3) in $CL_{primary}$ 108 is included in a request sent to the secondary site 110.

At 434, the change (c3) is inserted into $CL_{secondary}$ 114.

At 436, a change (c2) that has been executed on $TT_{secondary}$ 116 is marked as completed in $CL_{secondary}$ 114.

At 438 and 440, completed changes (c1 and c2) are removed from $CL_{secondary}$ 114, as their sequence ids were not included in the last request from the primary site 104.

FIG. 5 is a flowchart illustrating an example of a computer-implemented method 500 for generic tenant data replication for disaster recovery, according to an implementation of the present disclosure. For clarity of presentation, the description that follows generally describes method 500 in the context of the other figures in this description. However, it will be understood that method 500 can be performed, for example, by any system, environment, software, and hardware, or a combination of systems, environments, software, and hardware, as appropriate. In some implementations, various steps of method 500 can be run in parallel, in combination, in loops, or in any order.

At 502, a primary replication agent on a primary site regularly checks for changes to a primary change log on the primary site. In some implementations, the primary replication agent stores a replication configuration in an application or service database on the primary site, where the replication configuration stores: 1) a list of tenant dependent tables; 2) for each tenant dependent table, a name of a discriminator column; 3) a list of tenant ids on the primary site for which data replication is active; and 4) for each tenant id on the primary site, a tenant id and replication agent endpoint on the secondary site, where the replication configuration is used for capturing changes to database tables and storing the changes with data from the replication configuration in a change log to be accessed by a replication agent. In some implementations, the secondary replication agent on the secondary site, receives changes from the primary change log on the primary site sent from the primary replication agent on the primary site, and using the secondary replication agent, writing the changes to the secondary change log. From 502, method 500 proceeds to 504.

At 504, based on an insert of a new change record in a secondary change log on a secondary site, triggering a stored procedure from secondary stored procedures on the secondary site, wherein the stored procedure from the secondary stored procedures extracts a change operation and data from the secondary change log. From 504, method 500 proceeds to 506.

At 506, using the stored procedure from the secondary stored procedures, performing the changed operation on a secondary tenant table on the secondary site. In some implementations, after performing, using the stored procedure from the secondary stored procedures, the changed operation on a secondary tenant table on the secondary site, marking the change record in the secondary change log as completed. From 506, method 500 proceeds to 508.

At 508, by a secondary replication agent on the secondary site and from the primary replication agent on the primary site, receiving a call that does not contain a sequence id for a change record marked as completed in the secondary change log, and deleting the change record from the secondary change log. From 508, method 500 proceeds to 510.

At 510, using a replication agents control plane, providing central monitoring for the primary replication agent and the secondary replication agent. In some implementations, the replication agents control plane contains a list of deployed replication agents for applications and services. In some implementations, providing central monitoring, using a replication agents control plane, the primary replication agent and the secondary replication agent, includes: regularly calling, using the replication agents control plane, the primary replication agent and the secondary replication agent; and querying the primary replication agent and the secondary replication agent about a status of the primary change log and the secondary change log. In some implementations, the primary replication agent and the secondary replication agent checks a number of records in the primary change log and the secondary change log, respectively. After 510, method 500 can stop.

Figure 6:
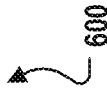
FIG. 6 is a block diagram illustrating an example of a computer-implemented system used to provide computational functionalities associated with described algorithms, methods, functions, processes, flows, and procedures, according to an implementation of the present disclosure.

FIG. 6 is a block diagram illustrating an example of a computer-implemented System 600 used to provide computational functionalities associated with described algorithms, methods, functions, processes, flows, and procedures, according to an implementation of the present disclosure. In the illustrated implementation, computer-implemented system 600 includes a Computer 602 and a Network 630.

The illustrated Computer 602 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 602 can include an input device, such as a keypad, keyboard, or touch screen, or a combination of input devices that can accept user information, and an output device that conveys information associated with the operation of the Computer 602, including digital data, visual, audio, another type of information, or a combination of types of information, on a graphical-type user interface (UI) (or GUI) or other UI.

The Computer 602 can serve in a role in a distributed computing system as, for example, a client, network component, a server, or a database or another persistency, or a combination of roles for performing the subject matter described in the present disclosure. The illustrated Computer 602 is communicably coupled with a Network 630. In some implementations, one or more components of the Computer 602 can be configured to operate within an environment, or a combination of environments, including cloud-computing, local, or global.

At a high level, the Computer 602 is an electronic computing device operable to receive, transmit, process, store, or manage data and information associated with the described subject matter. According to some implementations, the Computer 602 can also include or be communicably coupled with a server, such as an application server, e-mail server, web server, caching server, or streaming data server, or a combination of servers.

The Computer 602 can receive requests over Network 630 (for example, from a client software application executing on another Computer 602) and respond to the received requests by processing the received requests using a software application or a combination of software applications. In addition, requests can also be sent to the Computer 602 from internal users (for example, from a command console or by another internal access method), external or third-parties, or other entities, individuals, systems, or computers.

Each of the components of the Computer 602 can communicate using a System Bus 603. In some implementations, any or all of the components of the Computer 602, including hardware, software, or a combination of hardware and software, can interface over the System Bus 603 using an application programming interface (API) 612, a Service Layer 613, or a combination of the API 612 and Service Layer 613. The API 612 can include specifications for routines, data structures, and object classes. The API 612 can be either computer-language independent or dependent and refer to a complete interface, a single function, or even a set of APIs. The Service Layer 613 provides software services to the Computer 602 or other components (whether illustrated or not) that are communicably coupled to the Computer 602. The functionality of the Computer 602 can be accessible for all service consumers using the Service Layer 613. Software services, such as those provided by the Service Layer 613, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 602, alternative implementations can illustrate the API 612 or the Service Layer 613 as stand-alone components in relation to other components of the Computer 602 or other components (whether illustrated or not) that are communicably coupled to the Computer 602. Moreover, any or all parts of the API 612 or the Service Layer 613 can be implemented as a child or a sub-module of another software module, enterprise application, or hardware module without departing from the scope of the present disclosure.

The Computer 602 includes an Interface 604. Although illustrated as a single Interface 604, two or more Interfaces 604 can be used according to particular needs, desires, or particular implementations of the Computer 602. The Interface 604 is used by the Computer 602 for communicating with another computing system (whether illustrated or not) that is communicatively linked to the Network 630 in a distributed environment. Generally, the Interface 604 is operable to communicate with the Network 630 and includes logic encoded in software, hardware, or a combination of software and hardware. More specifically, the Interface 604 can include software supporting one or more communication protocols associated with communications such that the Network 630 or hardware of Interface 604 is operable to communicate physical signals within and outside of the illustrated Computer 602.

The Computer 602 includes a Processor 605. Although illustrated as a single Processor 605, two or more Processors 605 can be used according to particular needs, desires, or particular implementations of the Computer 602. Generally, the Processor 605 executes instructions and manipulates data to perform the operations of the Computer 602 and any algorithms, methods, functions, processes, flows, and procedures as described in the present disclosure.

The Computer 602 also includes a Database 606 that can hold data for the Computer 602, another component communicatively linked to the Network 630 (whether illustrated or not), or a combination of the Computer 602 and another component. For example, Database 606 can be an in-memory or conventional database storing data consistent with the present disclosure. In some implementations, Database 606 can be a combination of two or more different database types (for example, a hybrid in-memory and conventional database) according to particular needs, desires, or particular implementations of the Computer 602 and the described functionality. Although illustrated as a single Database 606, two or more databases of similar or differing types can be used according to particular needs, desires, or particular implementations of the Computer 602 and the described functionality. While Database 606 is illustrated as an integral component of the Computer 602, in alternative implementations, Database 606 can be external to the Computer 602. The Database 606 can hold and operate on at least any data type mentioned or any data type consistent with this disclosure.

The Computer 602 also includes a Memory 607 that can hold data for the Computer 602, another component or components communicatively linked to the Network 630 (whether illustrated or not), or a combination of the Computer 602 and another component. Memory 607 can store any data consistent with the present disclosure. In some implementations, Memory 607 can be a combination of two or more different types of memory (for example, a combination of semiconductor and magnetic storage) according to particular needs, desires, or particular implementations of the Computer 602 and the described functionality. Although illustrated as a single Memory 607, two or more Memories 607 or similar or differing types can be used according to particular needs, desires, or particular implementations of the Computer 602 and the described functionality. While Memory 607 is illustrated as an integral component of the Computer 602, in alternative implementations, Memory 607 can be external to the Computer 602.

The Application 608 is an algorithmic software engine providing functionality according to particular needs, desires, or particular implementations of the Computer 602, particularly with respect to functionality described in the present disclosure. For example, Application 608 can serve as one or more components, modules, or applications. Further, although illustrated as a single Application 608, the Application 608 can be implemented as multiple Applications 608 on the Computer 602. In addition, although illustrated as integral to the Computer 602, in alternative implementations, the Application 608 can be external to the Computer 602.

The Computer 602 can also include a Power Supply 614. The Power Supply 614 can include a rechargeable or non-rechargeable battery that can be configured to be either user- or non-user-replaceable. In some implementations, the Power Supply 614 can include power-conversion or management circuits (including recharging, standby, or another power management functionality). In some implementations, the Power Supply 614 can include a power plug to allow the Computer 602 to be plugged into a wall socket or another power source to, for example, power the Computer 602 or recharge a rechargeable battery.

There can be any number of Computers 602 associated with, or external to, a computer system containing Computer 602, each Computer 602 communicating over Network 630. Further, the term "client," "user," or other appropriate terminology can be used interchangeably, as appropriate, without departing from the scope of the present disclosure. Moreover, the present disclosure contemplates that many users can use one Computer 602, or that one user can use multiple computers 602.

Described implementations of the subject matter can include one or more features, alone or in combination.

For example, in a first implementation, a computer-implemented method for generic tenant data replication for disaster recovery, comprising: regularly checking, by a primary replication agent on a primary site, for changes to a primary change log on the primary site; triggering, based on an insert of a new change record in a secondary change log on a secondary site, a stored procedure from secondary stored procedures on the secondary site, wherein the stored procedure from the secondary stored procedures extracts a change operation and data from the secondary change log; performing, using the stored procedure from the secondary stored procedures, the changed operation on a secondary tenant table on the secondary site; receiving, by a secondary replication agent on the secondary site and from the primary replication agent on the primary site, a call that does not contain a sequence id for a change record marked as completed in the secondary change log, and deleting the change record from the secondary change log; and providing central monitoring, using a replication agents control plane, for the primary replication agent and the secondary replication agent.

The foregoing and other described implementations can each, optionally, include one or more of the following features:

A first feature, combinable with any of the following features, comprising: receiving, by the secondary replication agent on the secondary site, changes from the primary change log on the primary site sent from the primary replication agent on the primary site; and writing, using the secondary replication agent, the changes to the secondary change log.

A second feature, combinable with any of the previous or following features, comprising: after performing, using the stored procedure from the secondary stored procedures, the changed operation on a secondary tenant table on the secondary site, marking the change record in the secondary change log as completed.

A third feature, combinable with any of the previous or following features, wherein, providing central monitoring, using a replication agents control plane, the primary replication agent and the secondary replication agent, comprises: regularly calling, using the replication agents control plane, the primary replication agent and the secondary replication agent; and querying the primary replication agent and the secondary replication agent about a status of the primary change log and the secondary change log.

A fourth feature, combinable with any of the previous or following features, comprising: checking, by the primary replication agent and the secondary replication agent a number of records in the primary change log and the secondary change log, respectively.

A fifth feature, combinable with any of the previous or following features, wherein the replication agents control plane contains a list of deployed replication agents for applications and services.

A sixth feature, combinable with any of the previous or following features, wherein the primary replication agent stores a replication configuration in an application or service database on the primary site, wherein the replication configuration stores: 1) a list of tenant dependent tables; 2) for each tenant dependent table, a name of a discriminator column; 3) a list of tenant ids on the primary site for which data replication is active; and 4) for each tenant id on the primary site, a tenant id and replication agent endpoint on the secondary site, and wherein the replication configuration is used for capturing changes to database tables and storing the changes with data from the replication configuration in a change log to be accessed by a replication agent.

In a second implementation, a non-transitory, computer-readable medium storing one or more instructions executable by a computer system to perform one or more operations for generic tenant data replication for disaster recovery, comprising: regularly checking, by a primary replication agent on a primary site, for changes to a primary change log on the primary site; triggering, based on an insert of a new change record in a secondary change log on a secondary site, a stored procedure from secondary stored procedures on the secondary site, wherein the stored procedure from the secondary stored procedures extracts a change operation and data from the secondary change log; performing, using the stored procedure from the secondary stored procedures, the changed operation on a secondary tenant table on the secondary site; receiving, by a secondary replication agent on the secondary site and from the primary replication agent on the primary site, a call that does not contain a sequence id for a change record marked as completed in the secondary change log, and deleting the change record from the secondary change log; and providing central monitoring, using a replication agents control plane, for the primary replication agent and the secondary replication agent.

The foregoing and other described implementations can each, optionally, include one or more of the following features:

A first feature, combinable with any of the following features, comprising: receiving, by the secondary replication agent on the secondary site, changes from the primary change log on the primary site sent from the primary replication agent on the primary site; and writing, using the secondary replication agent, the changes to the secondary change log.

A second feature, combinable with any of the previous or following features, comprising: after performing, using the stored procedure from the secondary stored procedures, the changed operation on a secondary tenant table on the secondary site, marking the change record in the secondary change log as completed.

A third feature, combinable with any of the previous or following features, wherein, providing central monitoring, using a replication agents control plane, the primary replication agent and the secondary replication agent, comprises: regularly calling, using the replication agents control plane, the primary replication agent and the secondary replication agent; and querying the primary replication agent and the secondary replication agent about a status of the primary change log and the secondary change log.

A fourth feature, combinable with any of the previous or following features, comprising: checking, by the primary replication agent and the secondary replication agent a number of records in the primary change log and the secondary change log, respectively.

A fifth feature, combinable with any of the previous or following features, wherein the replication agents control plane contains a list of deployed replication agents for applications and services.

A sixth feature, combinable with any of the previous or following features, wherein the primary replication agent stores a replication configuration in an application or service database on the primary site, wherein the replication configuration stores: 1) a list of tenant dependent tables; 2) for each tenant dependent table, a name of a discriminator column; 3) a list of tenant ids on the primary site for which data replication is active; and 4) for each tenant id on the primary site, a tenant id and replication agent endpoint on the secondary site, and wherein the replication configuration is used for capturing changes to database tables and storing the changes with data from the replication configuration in a change log to be accessed by a replication agent.

In a third implementation, a computer-implemented system for generic tenant data replication for disaster recovery, comprising: one or more computers; and one or more computer memory devices interoperably coupled with the one or more computers and having tangible, non-transitory, machine-readable media storing one or more instructions that, when executed by the one or more computers, perform one or more operations, comprising: regularly checking, by a primary replication agent on a primary site, for changes to a primary change log on the primary site; triggering, based on an insert of a new change record in a secondary change log on a secondary site, a stored procedure from secondary stored procedures on the secondary site, wherein the stored procedure from the secondary stored procedures extracts a change operation and data from the secondary change log; performing, using the stored procedure from the secondary stored procedures, the changed operation on a secondary tenant table on the secondary site; receiving, by a secondary replication agent on the secondary site and from the primary replication agent on the primary site, a call that does not contain a sequence id for a change record marked as completed in the secondary change log, and deleting the change record from the secondary change log; and providing central monitoring, using a replication agents control plane, for the primary replication agent and the secondary replication agent.

The foregoing and other described implementations can each, optionally, include one or more of the following features:

A first feature, combinable with any of the following features, comprising: receiving, by the secondary replication agent on the secondary site, changes from the primary change log on the primary site sent from the primary replication agent on the primary site; and writing, using the secondary replication agent, the changes to the secondary change log.

A second feature, combinable with any of the previous or following features, comprising: after performing, using the stored procedure from the secondary stored procedures, the changed operation on a secondary tenant table on the secondary site, marking the change record in the secondary change log as completed.

A third feature, combinable with any of the previous or following features, wherein, providing central monitoring, using a replication agents control plane, the primary replication agent and the secondary replication agent, comprises: regularly calling, using the replication agents control plane, the primary replication agent and the secondary replication agent; and querying the primary replication agent and the secondary replication agent about a status of the primary change log and the secondary change log.

A fourth feature, combinable with any of the previous or following features, comprising: checking, by the primary replication agent and the secondary replication agent a number of records in the primary change log and the secondary change log, respectively.

A fifth feature, combinable with any of the previous or following features, wherein the replication agents control plane contains a list of deployed replication agents for applications and services.

A sixth feature, combinable with any of the previous or following features, wherein the primary replication agent stores a replication configuration in an application or service database on the primary site, wherein the replication configuration stores: 1) a list of tenant dependent tables; 2) for each tenant dependent table, a name of a discriminator column; 3) a list of tenant ids on the primary site for which data replication is active; and 4) for each tenant id on the primary site, a tenant id and replication agent endpoint on the secondary site, and wherein the replication configuration is used for capturing changes to database tables and storing the changes with data from the replication configuration in a change log to be accessed by a replication agent.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/-R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network, or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for generic tenant data replication for disaster recovery, comprising:

regularly checking, by a primary replication agent on a primary site, for changes to a primary change log on the primary site;

triggering, based on an insert of a new change record in a secondary change log on a secondary site, a stored procedure from secondary stored procedures on the secondary site, wherein the stored procedure from the secondary stored procedures extracts a change operation and data from the secondary change log;

performing, using the stored procedure from the secondary stored procedures, the changed operation on a secondary tenant table on the secondary site;

receiving, by a secondary replication agent on the secondary site and from the primary replication agent on the primary site, a call that does not contain a sequence id for a change record marked as completed in the secondary change log, and deleting the change record from the secondary change log; and providing central monitoring, using a replication agents control plane, for the primary replication agent and the secondary replication agent.

2. The computer-implemented method of claim 1, comprising:

receiving, by the secondary replication agent on the secondary site, changes from the primary change log on the primary site sent from the primary replication agent on the primary site; and writing, using the secondary replication agent, the changes to the secondary change log.

3. The computer-implemented method of claim 1, comprising:

after performing, using the stored procedure from the secondary stored procedures, the changed operation on a secondary tenant table on the secondary site, marking the change record in the secondary change log as completed.

4. The computer-implemented method of claim 1, wherein, providing central monitoring, using a replication agents control plane, the primary replication agent and the secondary replication agent, comprises:

regularly calling, using the replication agents control plane, the primary replication agent and the secondary replication agent; and querying the primary replication agent and the secondary replication agent about a status of the primary change log and the secondary change log.

5. The computer-implemented method of claim 1, comprising:

checking, by the primary replication agent and the secondary replication agent a number of records in the primary change log and the secondary change log, respectively.

6. The computer-implemented method of claim 1, wherein the replication agents control plane contains a list of deployed replication agents for applications and services.

7. The computer-implemented method of claim 1, wherein the primary replication agent stores a replication configuration in an application or service database on the primary site, wherein the replication configuration stores: 1) a list of tenant dependent tables; 2) for each tenant dependent table, a name of a discriminator column; 3) a list of tenant ids on the primary site for which data replication is active; and 4) for each tenant id on the primary site, a tenant id and replication agent endpoint on the secondary site, and wherein the replication configuration is used for capturing changes to database tables and storing the changes with data from the replication configuration in a change log to be accessed by a replication agent.

8. A non-transitory, computer-readable medium storing one or more instructions executable by a computer system to perform one or more operations for generic tenant data replication for disaster recovery, comprising:

regularly checking, by a primary replication agent on a primary site, for changes to a primary change log on the primary site;

triggering, based on an insert of a new change record in a secondary change log on a secondary site, a stored procedure from secondary stored procedures on the secondary site, wherein the stored procedure from the secondary stored procedures extracts a change operation and data from the secondary change log;

performing, using the stored procedure from the secondary stored procedures, the changed operation on a secondary tenant table on the secondary site;

receiving, by a secondary replication agent on the secondary site and from the primary replication agent on the primary site, a call that does not contain a sequence id for a change record marked as completed in the secondary change log, and deleting the change record from the secondary change log; and providing central monitoring, using a replication agents control plane, for the primary replication agent and the secondary replication agent.

9. The non-transitory, computer-readable medium of claim 8, comprising:

receiving, by the secondary replication agent on the secondary site, changes from the primary change log on the primary site sent from the primary replication agent on the primary site; and writing, using the secondary replication agent, the changes to the secondary change log.

10. The non-transitory, computer-readable medium of claim 8, comprising:

after performing, using the stored procedure from the secondary stored procedures, the changed operation on a secondary tenant table on the secondary site, marking the change record in the secondary change log as completed.

11. The non-transitory, computer-readable medium of claim 8, wherein, providing central monitoring, using a replication agents control plane, the primary replication agent and the secondary replication agent, comprises:

regularly calling, using the replication agents control plane, the primary replication agent and the secondary replication agent; and querying the primary replication agent and the secondary replication agent about a status of the primary change log and the secondary change log.

12. The non-transitory, computer-readable medium of claim 8, comprising:

checking, by the primary replication agent and the secondary replication agent a number of records in the primary change log and the secondary change log, respectively.

13. The non-transitory, computer-readable medium of claim 8, wherein the replication agents control plane contains a list of deployed replication agents for applications and services.

14. The non-transitory, computer-readable medium of claim 8, wherein the primary replication agent stores a replication configuration in an application or service database on the primary site, wherein the replication configuration stores: 1) a list of tenant dependent tables; 2) For each tenant dependent table, a name of a discriminator column; 3) a list of tenant ids on the primary site for which data replication is active; and 4) for each tenant id on the primary site, a tenant id and replication agent endpoint on the secondary site, and wherein the replication configuration is used for capturing changes to database tables and storing the changes with data from the replication configuration in a change log to be accessed by a replication agent.

15. A computer-implemented system for generic tenant data replication for disaster recovery, comprising:

one or more computers; and one or more computer memory devices interoperably coupled with the one or more computers and having tangible, non-transitory, machine-readable media storing one or more instructions that, when executed by the one or more computers, perform one or more operations, comprising:

regularly checking, by a primary replication agent on a primary site, for changes to a primary change log on the primary site;

triggering, based on an insert of a new change record in a secondary change log on a secondary site, a stored procedure from secondary stored procedures on the secondary site, wherein the stored procedure from the secondary stored procedures extracts a change operation and data from the secondary change log;

performing, using the stored procedure from the secondary stored procedures, the changed operation on a secondary tenant table on the secondary site;

receiving, by a secondary replication agent on the secondary site and from the primary replication agent on the primary site, a call that does not contain a sequence id for a change record marked as completed in the secondary change log, and deleting the change record from the secondary change log; and providing central monitoring, using a replication agents control plane, for the primary replication agent and the secondary replication agent.

16. The computer-implemented system of claim 15, comprising:

receiving, by the secondary replication agent on the secondary site, changes from the primary change log on the primary site sent from the primary replication agent on the primary site; and writing, using the secondary replication agent, the changes to the secondary change log.

17. The computer-implemented system of claim 15, comprising:

after performing, using the stored procedure from the secondary stored procedures, the changed operation on a secondary tenant table on the secondary site, marking the change record in the secondary change log as completed.

18. The computer-implemented system of claim 15, wherein, providing central monitoring, using a replication agents control plane, the primary replication agent and the secondary replication agent, comprises:

regularly calling, using the replication agents control plane, the primary replication agent and the secondary replication agent; and querying the primary replication agent and the secondary replication agent about a status of the primary change log and the secondary change log.

19. The computer-implemented system of claim 15, comprising:

checking, by the primary replication agent and the secondary replication agent a number of records in the primary change log and the secondary change log, respectively.

20. The computer-implemented system of claim 15, wherein the replication agents control plane contains a list of deployed replication agents for applications and services.

* * * * *